United States Patent [19]

Farragher

[11] 4,076,159

[45] Feb. 28, 1978

[54] BREAKING FLAT GLASS INTO CULLET

[75] Inventor: Joseph Farragher, Southport, England

[73] Assignee: Pilkington Brothers Limited, St. Melens, England

[21] Appl. No.: 733,720

[22] Filed: Oct. 18, 1976

[30] Foreign Application Priority Data

Oct. 29, 1975 United Kingdom ............... 44693/75

[51] Int. Cl.² ............................................ C03B 33/02
[52] U.S. Cl. .......................................... 225/3; 225/4; 225/96.5; 225/97
[58] Field of Search ....................................... 225/2–4, 225/93, 96.5, 97, 103

[56] References Cited

U.S. PATENT DOCUMENTS

| 2,259,765 | 10/1941 | Morris | 225/93 |
| 3,044,216 | 7/1962 | Billinger | 225/93 X |
| 3,275,207 | 9/1966 | Preudhomme | 225/97 X |
| 3,493,155 | 2/1970 | Litant et al. | 225/2 |
| 3,730,410 | 5/1973 | Altshuler | 225/2 X |
| 3,770,173 | 11/1973 | Carothers et al. | 225/2 |

Primary Examiner—Frank T. Yost
Attorney, Agent, or Firm—Burns, Doane, Swecker & Mathis

[57] ABSTRACT

Flat glass advancing along a conveyor in the form of a continuous ribbon or individual sheets, is broken into cullet by applying breaking loads to the glass which put breaking stresses into the glass simultaneously about two axes which are substantially orthogonal to one another.

12 Claims, 12 Drawing Figures

BREAKING FLAT GLASS INTO CULLET

BACKGROUND OF THE INVENTION

This invention relates to breaking flat glass into cullet and provides a method and apparatus for breaking flat glass ribbon or discrete glass sheets into cullet of controlled size. Both ordinary glass and wired glass can be broken.

Flat glass breakers which are currently in use generate large volumes of cullet dust. This dust is troublesome to glass cutting lines and ancillary equipment. Since the inception of improved automatic warehousing equipment it has become increasingly important to reduce and control the quantities of cullet dust.

Increased production rates increase the quantity of dust generated and aggravate the problems resulting.

It is a main object of the present invention to break flat glass in sheet or ribbon form into cullet of acceptable size with reduced generation of cullet dust.

A further object of the invention is to reduce the noise level which has been associated with the breaking of flat glass into cullet in the customary manner.

SUMMARY OF THE INVENTION

According to the invention a method of breaking flat glass into cullet comprises simultaneously applying breaking loads to the glass to put breaking stresses into the glass about two axes which are substantially orthogonal to each other.

The method is usually applied to flat glass which is advancing on a conveyor and a preferred method comprises supporting and advancing the glass, and bending the glass downwardly as it is advanced to apply a breaking stress across the glass, while simultaneously applying breaking stresses to the downwardly bent glass at a series of locations across the downwardly bent glass.

Preferably the glass is bent downwardly over a support for the whole undersurface of the glass so that the breaking stress is applied uniformly across the width of the glass.

Stresses may be applied simultaneously to the downwardly bent glass at a series of locations by engaging the under surface of the downwardly bent glass at a series of supporting locations which are equispaced across the glass and pressing the upper surface of the glass downwardly between each pair of adjacent supporting locations simultaneously to apply said breaking stresses to the downwardly bent glass.

The invention also comprehends apparatus for breaking flat glass into cullet comprising means for supporting and advancing the glass, traction means for applying traction to and supporting the advancing glass across its width, pressure means located beyond said traction means in the direction of advance of the glass and engaging both faces of the glass to bend the glass downwardly over the traction means to apply a breaking stress across the glass and to apply breaking stresses to the downwardly bent glass at a series of locations across the glass, which breaking stresses applied to the downwardly bent glass act at right angles to said breaking stress applied across the glass, and means for driving said traction means and pressure means to apply traction to the advancing glass.

The traction means may comprise a pair of traction rollers at least the lower one of which has a cylindrical surface, and the pressure means may include an upper roller having spaced peripheral rings, which upper roller is arranged so that the peripheral rings engage the upper surface of the glass advancing through the traction rollers and bend the glass downwardly over the cylindrical surface of the lower traction roller.

In one embodiment the pressure means includes a lower roller having spaced peripheral rings which engage the downwardly bent glass at a series of supporting locations, the peripheral rings of the upper pressure roller are staggered relative to the rings of the lower roller, and the peripheral rings of the two rollers just overlap so as to apply stresses to the downwardly bent glass at said series of locations.

In another embodiment the pressure means includes a series of pegs spaced apart beneath the upper roller of the pressure means which pegs are mounted between the peripheral rings of the upper roller so that the glass slides over the pegs as it is pressed downwardly between them by the peripheral rings of the upper roller.

BRIEF DESCRIPTION OF THE DRAWINGS

Some embodiment of the invention will now be described, by way of example, with reference to the accompanying drawings in which.

DESCRIPTION OF THE PREFERRED EMBODIMENTS

Figure 1:
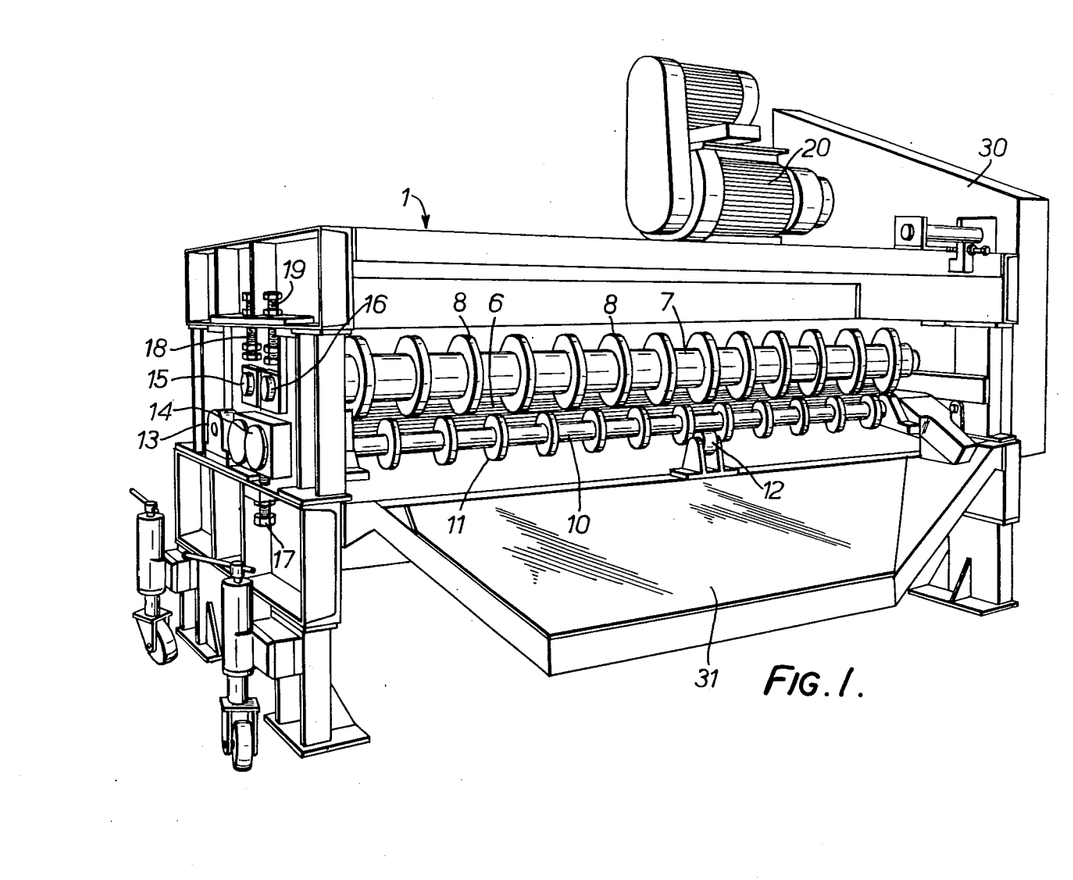
FIG. 1 is a front perspective view of apparatus according to the invention for breaking flat glass into cullet.
Figure 2:
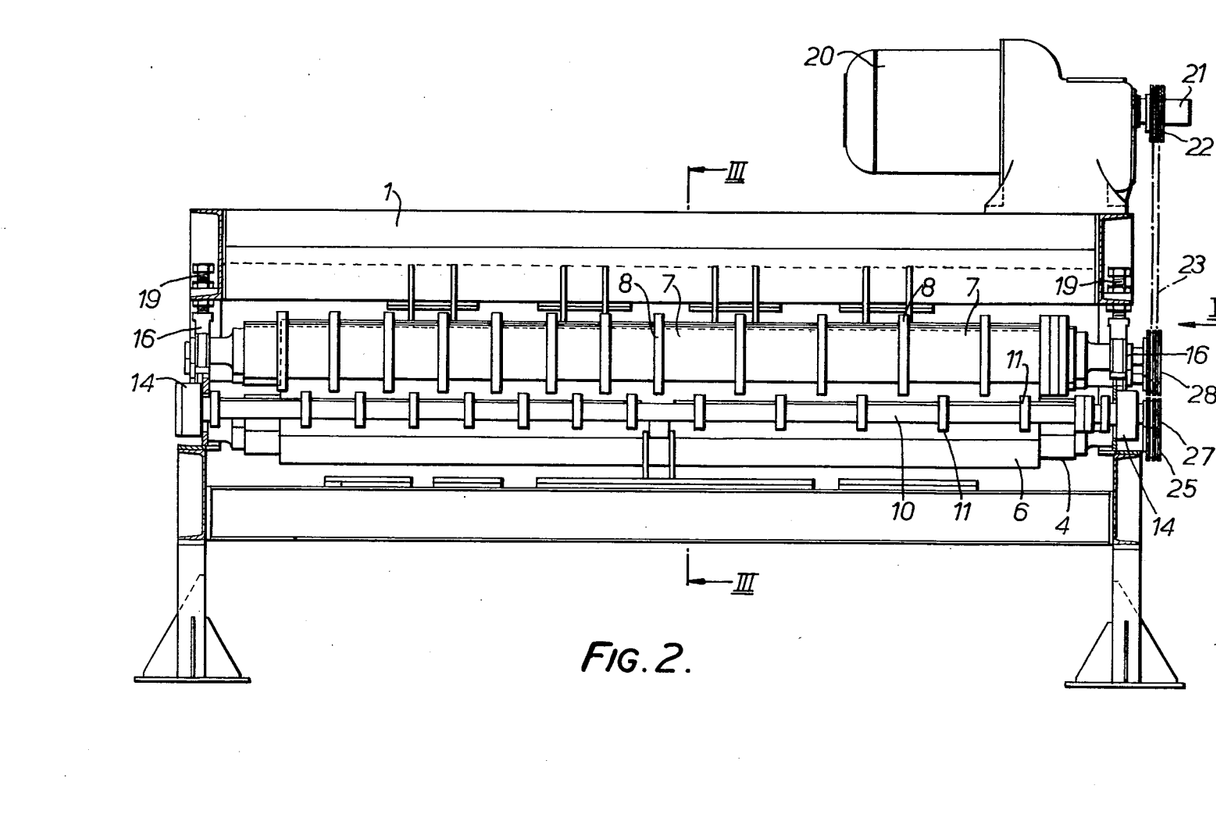
FIG. 2 is a front elevation of part of the apparatus of FIG. 1.
Figure 3:
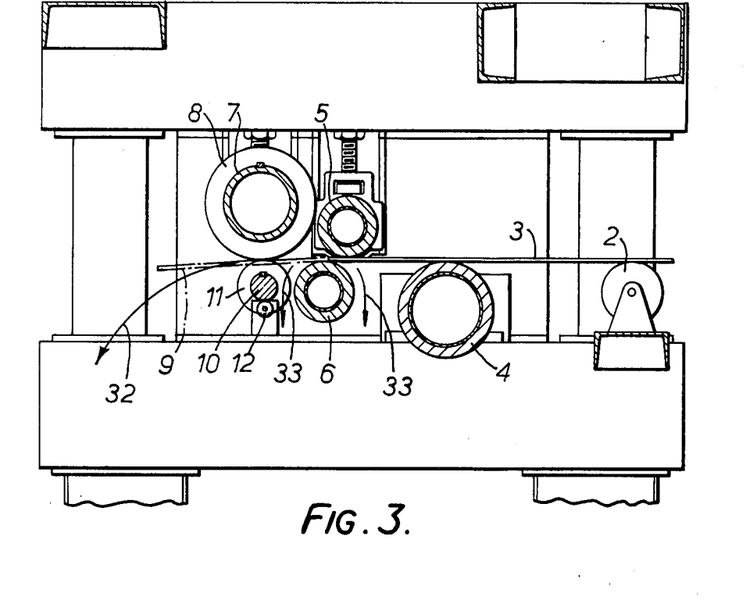
FIG. 3 is a section on line III—III of FIG. 2.

Referring to FIGS. 1 to 5 of the drawings apparatus for breaking flat glass into cullet comprises an arch structure indicated at 1 which is shown mounted at one end of a conveyor line along which glass sheets are fed, sheets to be broken into cullet being permitted to travel to the end of the line. In FIG. 3 the last roller 2 of the conveyor line is shown and a sheet of glass 3 to be broken is advanced from the last conveyor roller 2 to an optional supporting roller 4 which receives the glass sheet 3 from the conveyor and supports and advances that sheet to means for applying traction to and supporting the advancing sheet across its width. This traction means comprises a pair of traction rollers 5 and 6 which are steel rollers. The lower roller 6 is mounted so that its upper surface is level with the rollers 2 and 4 and the upper roller is mounted just ahead of the lower roller. These rollers are adjusted so that the nip between the rollers is commensurate with the range of thickness of glass sheets to be broken. The rollers 5 and 6 are steel rollers with cylindrical surfaces. To facilitate traction between the rollers 5 and 6 and the glass sheets a fine thread, or grooves, may be machined on the surfaces of the rollers.

Pressure means is located beyond the traction rollers 5 and 6 in the direction of advance of the glass and engages both faces of the sheet to bend the sheet downwardly over the lower traction roller 6. The pressure means includes an upper roller 7 which is a steel roller and has mounted on it a number of spaced peripheral steel rings 8. The upper roller is arranged so that the peripheral rings 8 engage the upper surface of a glass sheet advancing through the traction rollers 5 and 6 to bend that sheet downwardly over the cylindrical surface of the lower traction roller 6 as indicated at 9. The mounting of the upper traction roller just ahead of the lower roller 6 means that sheets of a thickness at the upper end of the thickness range for which the apparatus is set, advancing towards the nip between the traction rollers 5 and 6, are firmly held as the glass is pressed downwardly over the surface of the lower traction roller 6. Sheets of a thickness at the lower end of the thickness range may in practice not contact the upper roller 5 since with such thinner sheets the glass breaks more easily and breakage may be achieved by pressing downwardly over the lower roller 6 without the need for counter pressure by the upper roller 5.

Figure 4:
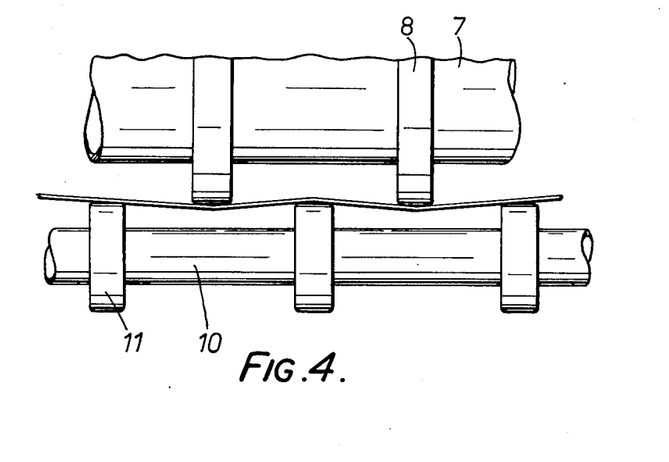
FIG. 4 is a detail of part of the apparatus as illustrated in FIG. 2.
Figure 5:
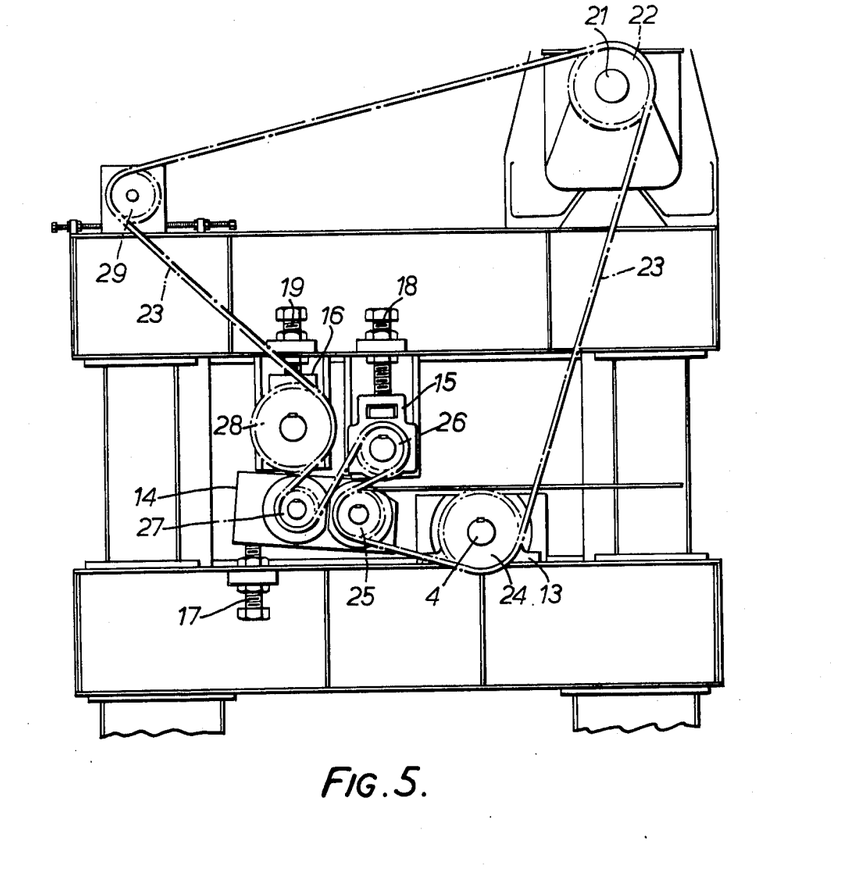
FIG. 5 is an end elevation of the apparatus in the direction of arrow V of FIG. 2.

The pressure means includes a lower steel roller 10 having spaced peripheral steel rings 11 which engage the under surface of the downwardly bent sheet at a series of supporting locations. As shown in FIGS. 2 and 3 in particular the peripheral rings 8 of the upper pressure roller are staggered relative to the peripheral rings 11 of the lower roller. The vertical spacing between the peripheral rings is less than the glass sheet thickness so that, as shown in FIG. 4, the upper surface of the glass sheet is pressed downwardly between each pair of adjacent peripheral rings 11 of the lower roller to apply stresses to the glass at a series of locations across the downwardly bent sheet, and for thin glass the peripheral rings may overlap. These stresses act in the direction of advance of the sheet orthogonally to the breaking stress applied uniformly across the width of the sheet as it is bent downwardly over the lower traction roller 6.

A small support roller 12 is mounted centrally beneath the lower pressure roller 10 and engages that roller to oppose possible bowing of the roller 10. The supporting roller 4 is mounted in fixed bearings 13. The ends of the lower traction roller 6 and the lower pressure roller 11 are mounted together in bearing blocks 14 which are adjustably mounted on the sides of the arch structure 1. The ends of the upper traction roller 5 are mounted in adjustable bearings 15 and the ends of the upper pressure roller 7 are similarly mounted in adjustable bearings 16. Apart from initial adjustment by means of the adjusting screws 17 the bearing blocks 14 are maintained in position relative to the supporting and guiding roller 4 and the end of the conveyor 2. The upper rollers 5 and 7 can however be adjusted by means of adjuster bolts 18 and 19 to provide varied working settings to adapt the apparatus to the breaking of glass of different thicknesses and to the breaking of wired glass. A drive motor 20 is mounted conveniently on top of the arch structure 1 and the output shaft 21 of the motor carries a multiple drive sprocket which drives an endless drive chain 23 which passes around a sprocket 24 which is keyed to the end shaft of the roller 4, sprockets 25 and 26 which are respectively keyed to the ends of the shafts of the traction rollers 6 and 5, and then around sprockets 27 and 28 which are respectively keyed to the ends of the shafts of the pressure rollers 10 and 7. From the sprocket 28 the chain 23 passes around a jockey sprocket 29 which is also mounted on the arch structure and which is adjustable in position to adjust the tension in the chain 23. The whole of the chain drive to the rollers is housed in a protective housing 30 shown in FIG. 1.

A chute apron 31 onto which cullet falls extends downwardly and forwardly in front of the pressure rollers to receive cullet which is ejected from the rollers in the direction of arrow 32. Most of the cullet when breaking flat glass is ejected in the direction of arrow 32. Occasionally small quantities may fall in the direction of arrows 33.

The feed of the drive motor 20 is adjustable either to give a speed of the rollers to match a maximum speed of glass being received from the conveyors, or to accelerate the glass into the breaker. The peripheral rings 8 and 11 are adjustable on their rollers 7 and 10 to give a spacing for example between 150 and 230 mm and in the embodiment illustrated the diameter of the bottom peripheral rings 11 is 100 mm and the diameter of the upper peripheral rings 8 is 225 mm. The positions of the upper rollers 5 and 7 was adjustable to adapt the machine to break flat glass of thickness in the range 2 mm to 10 mm and up to 2 m wide into acceptable cullet. The downward bending of the glass sheet as it passes beyond the roller 6 induces a high stress in the glass in the region above the roller 6 and the high bending stresses induced between the peripheral rings 8 and 11 of the pressure rollers induced transverse bending stresses which influence the cracks which develop in the glass into fanning out towards the sides of the glass sheet instead of travelling up the length of the glass in the opposite direction to the glass advance. Very little dust was produced and the cullet ejected forwardly in the direction 32 was of an acceptance size being in pieces of average size 200 mm. This cullet was allowed to fall into containers and then taken away from the machine for further size reduction prior to being recycled into the melting tank.

As well as subjecting the glass to breaking stresses at a series of locations, the peripheral ring of the driven rollers 10 and 7 provide traction to help draw the already breaking glass through the traction rollers 5 and 6 and impart a forward velocity to the pieces of cullet so that they are ejected forwardly from the machine. A value of about 1% was observed for the amount of cullet dust generated which represents an improvement upon conventional cullet making machinery. The quantity of cullet dust in practice varies with chosen cullet size resulting from ring spacing. The noise could also be reduced by isolating the breaking apparatus, so far as possible, in an acoustically designed housing.

Figure 6:
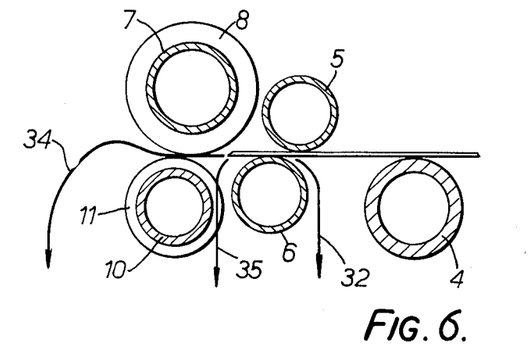
FIG. 6 illustrates a modified form of the apparatus of FIGS. 1 to 5 which is particularly suitable for breaking wired flat glass.

The embodiment illustrated diagrammatically in FIG. 6 is similar to that of FIGS. 1 to 5 and is adapted for the breaking of both ordinary flat glass and wired glass. The guiding roller 4 and the traction rollers 5 and 6 are similar but the lower pressure roller 10 is increased in diameter. It has been found that with the larger diameter the support roller 12 is not necessary. In the embodiment illustrated the diameter of the peripheral rings 11 of the lower roller are 180 mm and the diameter of the peripheral rings 8 of the upper roller 7 are 230 mm. With this arrangement flat glass of thickness up to 10 mm was effectively broken with about 80% of the cullet being ejected upwardly and forwardly in the direction of arrow 34 with about 15% falling in the direction of arrow 35 and about 5% in the direction of arrow 32. When breaking wired glass it was found that nearly 100% of the wired cullet was ejected upwardly and forwardly in the direction of arrow 34 and a small quantity of large particles dropped in the direction of arrow 32. Nearly all the wires were broken.

Figure 7:
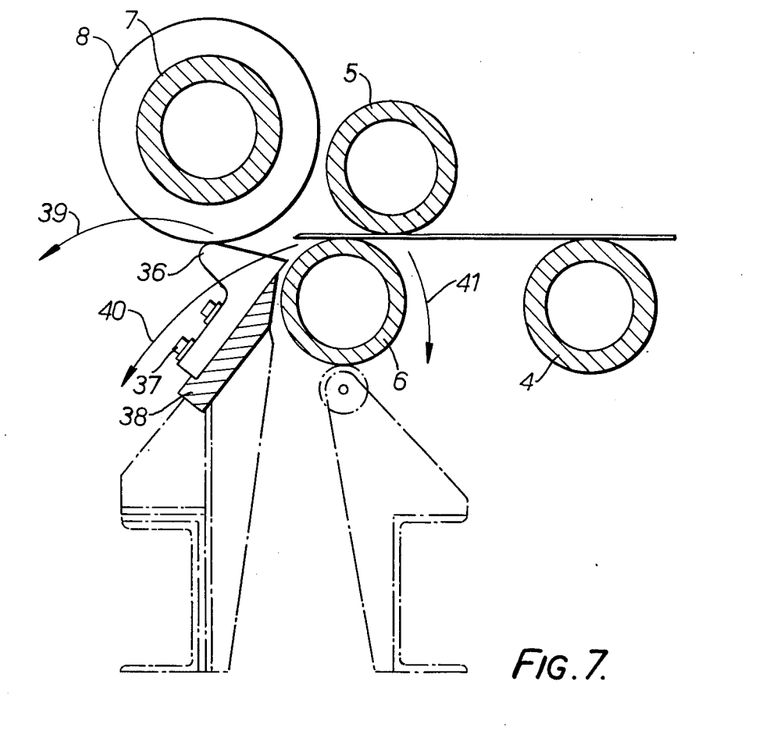
FIG. 7 is a sectional view through another embodiment of the invention.

Another embodiment of the invention is illustrated in FIG. 7. The upper and lower traction rollers 5 and 6 are steel rollers the same as illustrated in the embodiment of FIGS. 1 to 5. Also the upper pressure roller 7 with spaced peripheral rings 8 is the same as in FIGS. 1 to 5. In place of the lower pressure roller 10 the pressure means includes a series of steel pegs 36 which are mounted by bolts 37 on a cross beam 38 which extends beneath the upper pressure roller 7. The pegs 36 are spaced apart so that they are mounted between the peripheral rings 8 of the upper roller 7 with a spacing equivalent to that of the rings 11 on the lower roller 10 as shown in FIG. 4 for example. The glass sheet which is advanced forwardly by the traction rollers 5 and 6 slides over the pegs and is pressed downwardly between the pegs 36 by the peripheral rings of the upper roller. The pegs are 25 mm thick and a minimum spacing of 180 mm between the pegs was found to be desirable to avoid any build up of cullet on top of the pegs. When breaking flat glass using this arrangement 90% of the cullet was ejected forwardly in the direction of arrow 39, 5% of the cullet fell between the pegs in the direction of arrow 40 and about 5% fell away in the direction of arrow 41 upstream of the traction rollers 5 and 6. In each embodiment the apron 31 extends beneath the traction rollers 5 and 6 so as to collect all cullet falling in the region of those rollers.

Figure 8:
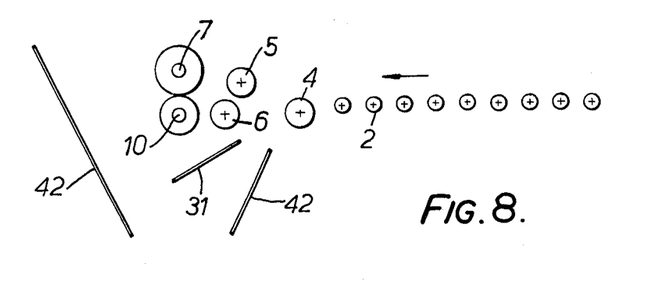
FIG. 8 illustrates the location of breaking apparatus according to the invention at the end of a roller conveyor.

FIG. 8 illustrates the breaking apparatus located at the end of a roller conveyor to receive and break up into cullet rejected sheets of glass which are allowed to pass through a take-off station at which the good sheets are removed from the conveyor for stacking. The apron 31 is mounted within a cullet chute whose walls 42 are located so as to catch all cullet ejected forwardly from and falling below the breaking apparatus. This apparatus can be used for breaking flat glass in the form of discrete sheets, or in the form of a continuous sheet or ribbon.

Figure 9:
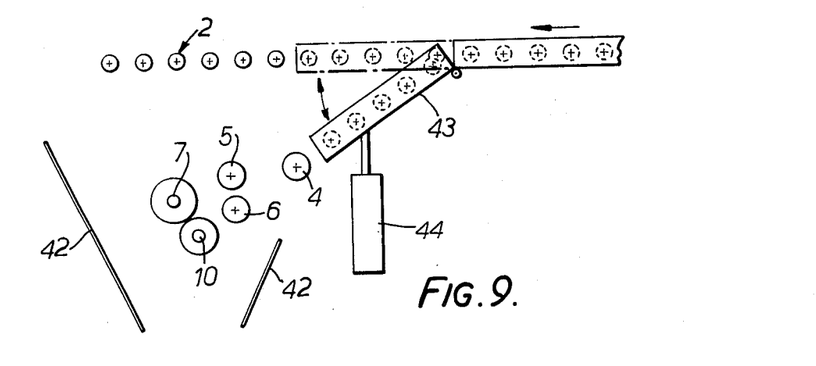
FIG. 9 illustrates breaking apparatus according to the invention mounted beneath a roller conveyor with means for diverting a glass sheet from the conveyor to the breaking apparatus, FIG. 10 also illustrates an arrangement for diverting sheets of glass from a conveyor to breaking apparatus located beneath the conveyor.

In the arrangement illustrated in FIG. 9 the breaking apparatus is for breaking discrete sheets of glass and is located beneath a roller conveyor line 2. The roller conveyor has a drop-section of well known kind which can be pivoted downwardly by operation of hydraulic jacks 44 connected to the drop section 43. When a sheet of glass is to be removed from the roller conveyor to the breaking apparatus the drop section 43 is dropped downwardly and the sheet to be broken runs down that section to the breaking machine. The drop section 43 is then returned to the horizontal. If a series of successive glass sheets are to be broken into cullet the drop section 43 is retained in its lower position. This kind of arrangement is suitable for relatively slow speed operation.

Figure 10:
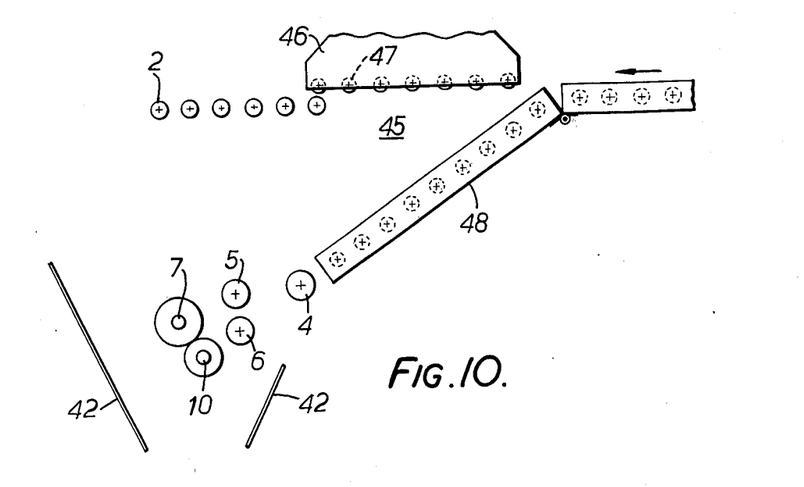
Figure 11:
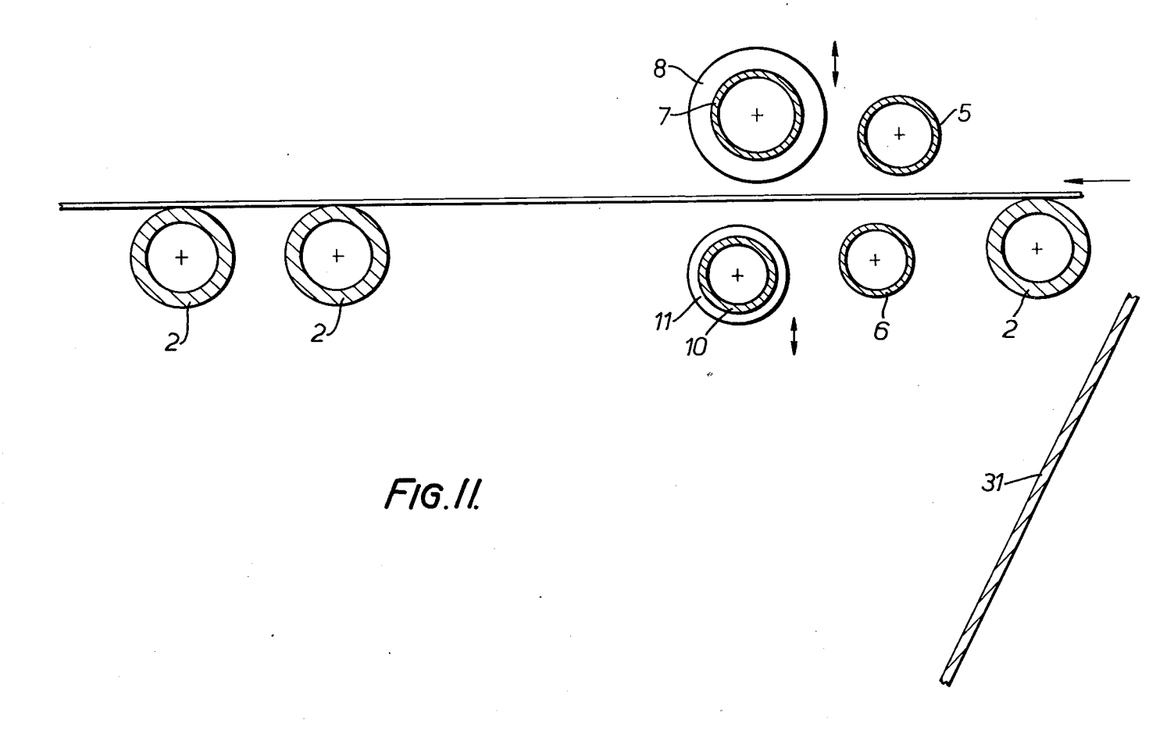
FIG. 11 illustrates another embodiment of breaking apparatus according to the invention in conjunction with a roller conveyor.

For higher speeds of operation the arrangement of FIG. 10 is employed for breaking discrete sheets of glass. There is a gap at 45 in the roller conveyor line 2 which gap is bridged by an over head suction transfer unit illustrated diagrammatically at 46, which unit comprises a suction hood with rollers 47 mounted in the hood so as to project just below the lower mouth of the hood. A sheet of glass to be transferred across the gap 45 is drawn upwardly against the rollers 47 by suction in the hood. The rollers 47 are driven and carry the sheet across the gap to deposit it on the continuation of the roller conveyor. An inclined driven conveyor section 48 extends downwardly as a continuation of the conveyor below the gap 45 and any sheet which is not picked up by the transfer unit and conveyed across the gap 45 moves downwardly along the inclined conveyor section 48 to the breaking apparatus. An arrangement of this kind is generally used to break up reject glass sheets which have been rendered faulty by improper action of some upstream operation for example cutting, or are detected upstream to have a manufacturing fault. Further, glass sheets which may not be faulty can be removed from the conveyor line in this way because some downwstream operation for example stacking is temporarily not operating properly so that the sheets have to be broken up while the stacking arrangement is being repaired. The reduction in cullet dust which is achieved by the breaking method and apparatus is particularly important in arrangements of the kind illustrated in FIGS. 9 and 10 where roller conveyors extend above the breaking rolls and it is important to minimize deposition of cullet dust anywhere in the vicinity of the roller conveyor. FIG. 11 illustrates another embodiment in which the breaking apparatus is mounted in a gap in a roller conveyor 2. The upper rollers 5 and 7 are mounted above the path of travel of the glass on the conveyor rollers 2 in a frame which is movable by a piston and cylinder assembly. The lower rollers 6 and 10 are similarly mounted in a frame below the level of the path of travel of the glass.

When the glass has to be broken the two frames are moved towards each other by their piston and cylinder assemblies. The lower traction roller 6 is raised to the level of the conveyor rollers 2, the upper traction roller 5 bears on the upper surface of the glass, and the breaking stresses are applied by the rollers 7 and 10 with their spaced peripheral rings 8 and 11. The cullet falls on to the apron 31 and is directed into a cullet chute.

Figure 12:
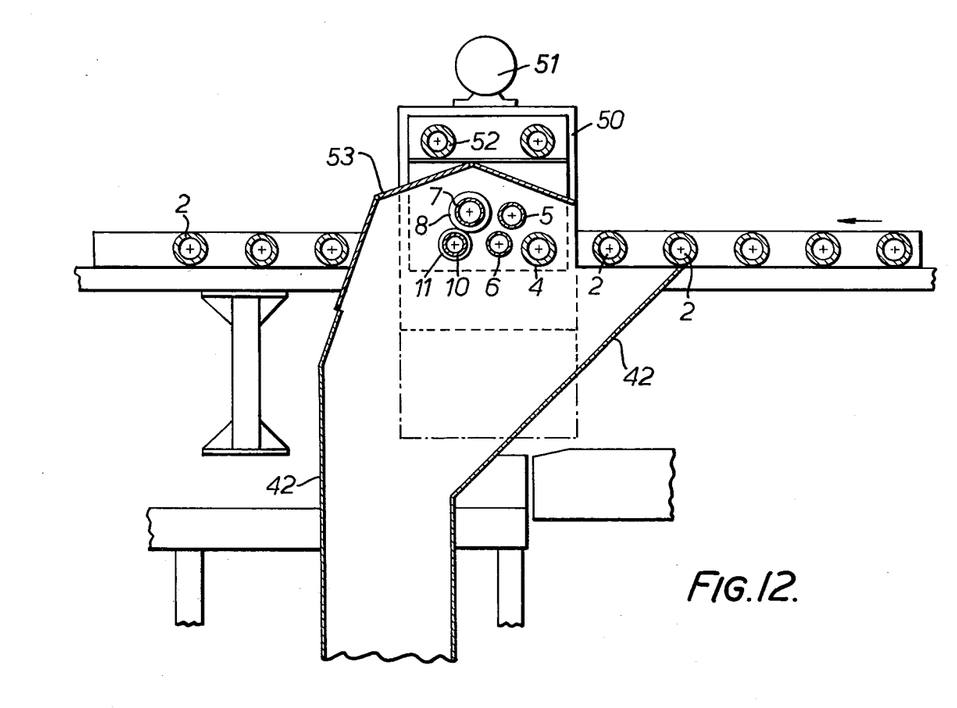
FIG. 12 illustrates another embodiment in which the breaking apparatus can be moved into line in a gap in a conveyor.

Another apparatus according to the invention, for breaking discrete glass sheets and for use in conjunction with a roller conveyor, is illustrated in FIG. 12. The supporting roller 4, the upper and lower traction rollers 5 and 6, and the upper and lower breaking rollers 7 and 10 are mounted in a vertically movable frame 50 which carries a drive motor 51 and two conveyor rollers 52 which can be positioned in line with the conveyor rollers 2 to bridge the gap in the conveyor for normal conveying operation. When the breaking apparatus is to be used the frame 50 is raised by pistons and cylinders, not shown, to raise the rollers 4, 5, 6, 7 and 10 of the breaking apparatus into line in the conveyor gap. The cullet falls into the cullet chute, and a canopy 53 is supported by the frame 50 over the breaking apparatus.

I claim:

1. A method of breaking flat glass into cullet, comprising supporting and advancing the flat glass and bending the glass as it is advanced to apply a breaking stress across the glass about a first axis, and simultaneously applying breaking stresses to the bent glass at a series of locations across the bent glass about an axis substantially orthogonal to said first axis.

2. A method according to claim 1, comprising engaging one surface of the bent glass at a series of supporting locations which are equispaced across the glass, and pressing the other surface of the glass between each pair of adjacent supporting locations simultaneously to apply said breaking stresses to the bent glass.

3. A method according to claim 1, comprising bending the glass over a support for the whole of one surface of the glass so that the breaking stress is applied uniformly across the width of the glass.

4. A method according to claim 3, comprising engaging one surface of the bent glass at a series of supporting locations which are equispaced across the glass and pressing the other surface of the glass between each pair of adjacent supporting locations simultaneously to apply said breaking stresses to the bent glass.

5. A method of breaking flat glass into cullet, comprising simultaneously applying breaking loads to the glass to put breaking stresses into the glass about two axes which are substantially orthogonal to each other by supporting and advancing the glass and bending the glass downwardly as it is advanced to apply a breaking stress across the glass, while simultaneously applying breaking stresses to the downwardly bent glass at a series of locations across the downwardly bent glass.

6. A method according to claim 5, comprising engaging the undersurface of the downwardly bent glass at a series of supporting locations which are equispaced across the glass, and pressing the upper surface of the glass downwardly between each pair of adjacent supporting locations simultaneously to apply said breaking stresses to the downwardly bent glass.

7. A method according to claim 5, comprising bending the glass downwardly over a support for the whole undersurface of the glass so that the breaking stress is applied uniformly across the width of the glass.

8. A method according to claim 7, comprising engaging the undersurface of the downwardly bent glass at a series of supporting locations which are equispaced across the glass, and pressing the upper surface of the glass downwardly between each pair of adjacent supporting locations simultaneously to apply said breaking stresses to the downwardly bent glass.

9. Apparatus for breaking flat glass into cullet comprising means for supporting and advancing the glass, traction means for applying traction to and supporting the advancing glass across its width, pressure means located beyond said traction means in the direction of advance of the glass and engaging both faces of the glass to bend the glass downwardly over the traction means to apply a breaking stress across the glass and to apply breaking stresses to the downwardly bent glass at a series of locations across the glass, which breaking stresses applied to the downwardly bent glass act at right angles to said breaking stress applied across the glass, and means for driving said traction means and pressure means to apply traction to the advancing glass.

10. Apparatus according to claim 9, wherein the traction means comprises a pair of traction rollers at least the lower one of which has a cylindrical surface, and the pressure means includes an upper roller having spaced peripheral rings, which upper roller is arranged so that the peripheral rings engage the upper surface of the glass advancing through the traction rollers and bend the glass downwardly over the cylindrical surface of the lower traction roller.

11. Apparatus according to claim 10, wherein the pressure means includes a lower roller having spaced peripheral rings which engage the downwardly bent glass at a series of supporting locations, the peripheral rings of the upper pressure roller are staggered relative to the rings of the lower roller, and the peripheral rings of the two rollers just overlap so as to apply stresses to the downwardly bent glass at said series of locations.

12. Apparatus according to claim 10, wherein the pressure means includes a series of pegs spaced apart beneath the upper roller of the pressure means which pegs are mounted between the peripheral rings of the upper roller so that the glass slides over the pegs as it is pressed downwardly between them by the peripheral rings of the upper roller.

* * * * *